United States Patent
Sugiyama et al.

(10) Patent No.: US 6,950,679 B2
(45) Date of Patent: Sep. 27, 2005

(54) PORTABLE TELEPHONE HAVING HIERARCHICALLY STRUCTURED MENUS OF EXECUTING FUNCTIONS

(75) Inventors: Kumiko Sugiyama, Tokyo (JP); Masato Namekawa, Chiba (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 09/881,858

(22) Filed: Jun. 15, 2001

(65) Prior Publication Data

US 2001/0053708 A1 Dec. 20, 2001

(30) Foreign Application Priority Data

Jun. 16, 2000 (JP) .................................... P2000-182092

(51) Int. Cl.[7] .............................................. H04M 1/00
(52) U.S. Cl. .................................. 455/566; 455/550.1
(58) Field of Search ............................ 455/566, 550.1, 455/501.1, 418, 575.1, 90.3; 345/873, 566, 168, 161

(56) References Cited

U.S. PATENT DOCUMENTS

| | | | | |
|---|---|---|---|---|
| 5,425,077 A | * | 6/1995 | Tsoi | 455/566 |
| 5,737,394 A | | 4/1998 | Anderson et al. | 379/88 |
| 5,797,098 A | | 8/1998 | Schroeder et al. | 455/464 |
| 6,047,197 A | * | 4/2000 | Jarrad | 455/566 |
| 6,154,214 A | * | 11/2000 | Uyehara et al. | 715/863 |
| 6,539,243 B1 | * | 3/2003 | Kimura et al. | 455/550.1 |
| 2003/0117380 A1 | * | 6/2003 | Kanzaki | 345/173 |

FOREIGN PATENT DOCUMENTS

| | | | |
|---|---|---|---|
| EP | 0679003 | 10/1995 | H04M/1/72 |
| EP | 0844777 | 5/1998 | H04M/1/72 |
| EP | 1004957 | 5/2000 | G06F/3/00 |

* cited by examiner

*Primary Examiner*—Nay Maung
*Assistant Examiner*—Angelica Perez
(74) *Attorney, Agent, or Firm*—Jay H. Maioli

(57) ABSTRACT

A portable telephone that executes a desired function with simple operations. The portable telephone that executes various functions selected from hierarchically structured menus is provided with dedicated execution keys 9 for instructing execution of functions, a function assigning device for assigning a desired function to an execution key 9, and a function executing device for executing a function assigned to an execution key 9 in response to a pressing of the execution key 9.

2 Claims, 6 Drawing Sheets

PORTABLE TELEPHONE HAVING HIERARCHICALLY STRUCTURED MENUS OF EXECUTING FUNCTIONS

BACKGROUND OF THE INVENTION

1. Field of the Invention

The present invention relates to a portable telephone, and more particularly, is suitably applied to a portable telephone which can select one from various kinds of functions and execute it.

2. Description of the Related Art

Some of portable telephones have various additional functions such as an incoming-call sound changing function of changing an incoming-call sound to a desired melody and an address directory function, as well as a communication function.

In such a portable telephone, these additional functions are arranged to hierarchically structured menu screens, the menu screens are displayed on a display to allow a user to view them and to select a desired additional function on a menu screen with given operation keys, and thereby the additional function is executed.

However, in such a portable telephone, the hierarchically structured menu screens have to be switched to select a desired additional function, in order to execute the desired additional function, which cause a problem in that the operations are complicated because the operation keys have to be operated many times.

In addition, some of such portable telephones each has execution keys dedicated to additional functions which are supposed to be often used, for example, an incoming-call sound silencing function, and executes the additional functions in response to pushing of the execution keys. However, it is not sure that all users often use the additional functions, which deteriorates the operability.

SUMMARY OF THE INVENTION

In view of the foregoing, an object of this invention is to provide a portable telephone which can execute a desired function with simple operations.

The foregoing object and other objects of the invention have been achieved by the provision of a portable telephone which can execute a function selected from hierarchically structured menus, comprises execution keys for instructing to execute functions, a function assigning means for assigning a desired function to an execution key, and a function executing means for executing a function assigned to an execution key.

Functions selected by a user from hierarchically structured menus are assigned to dedicated execution keys and the functions, which are assigned to the execution keys, are executed in response to the pressing of the execution keys, so that the functions can be executed with simple operations, regardless of the hierarchies which the functions are belong to.

Further, in the present invention, execution keys are provided next to a display means for displaying various information, and symbols representing the functions assigned to the execution keys are displayed next to the execution keys, which allows a user to easily and correctly recognize the functions assigned to the execution keys.

The nature, principle and utility of the invention will become mode apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Whole Configuration of Portable Telephone

Figure 1:
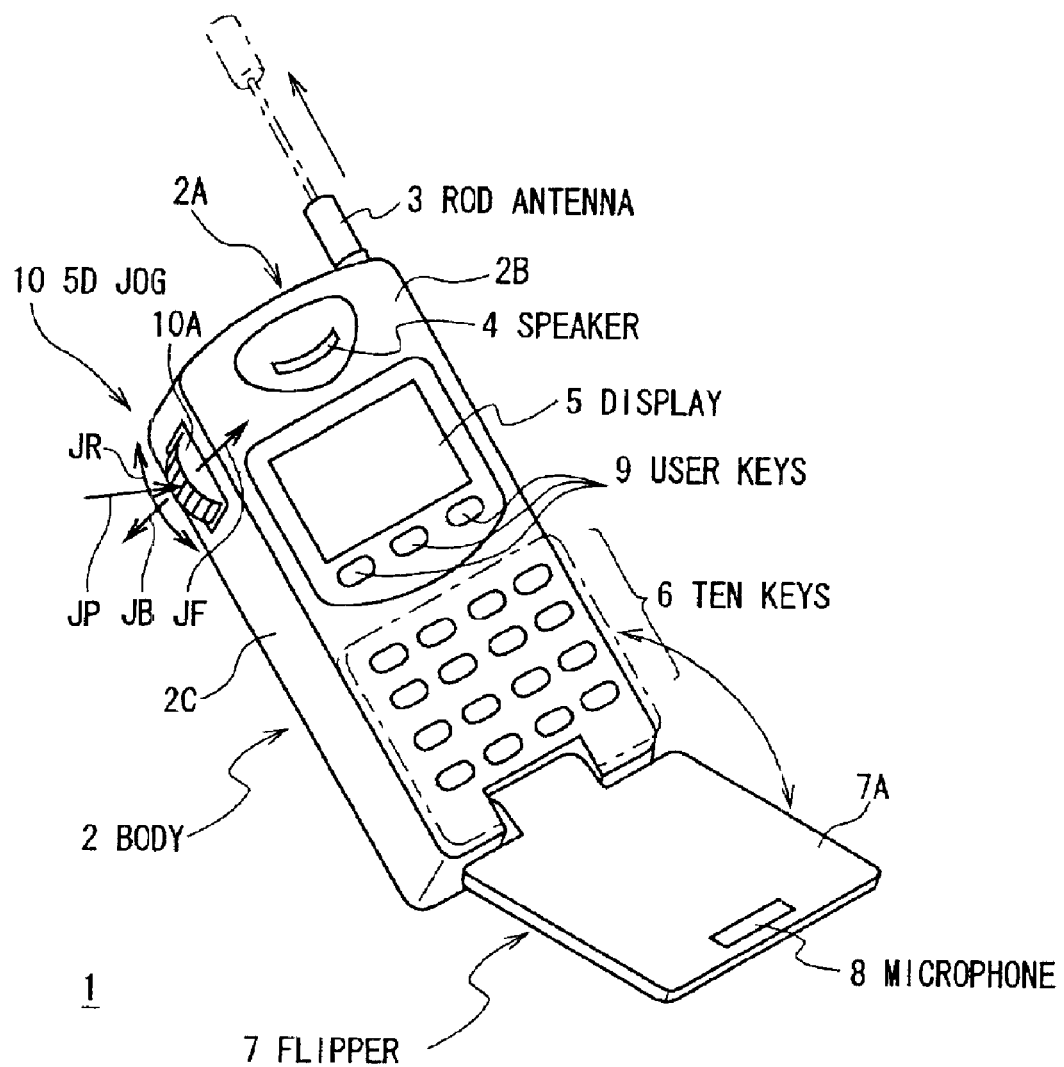
FIG. 1 is a schematic perspective view showing the whole configuration of a portable telephone according to an embodiment in the present invention.

In FIG. 1, a reference numeral 1 shows a portable telephone according to the present invention. Circuit boards having various circuits for radio communication disposed thereon and a power supply section for supplying power to each section of the portable telephone 1 and a battery are built in the box-typed body 2.

A rod antenna 3 which can be drawn and contained is disposed at the top 2A of the body 2, and a speaker 4 is provided at the upper part on the front surface 2B of the body 2. Further, a display 5 which is a LCD (Liquid Crystal Display) is provided under the speaker 4.

Ten keys 6 including numeral keys of "1" to "0", symbol keys of "★" and "#", and a call key are provided at the lower part of the front surface 2B.

In addition, a plate flipper 7 is attached so as to cover and uncover the lower part of the front surface 2B of the body 2, a microphone 8 is provided at the tip on the inside surface 7A of the flipper 7.

Therefore, the portable telephone 1 can be downsized to improve the portability and the ten keys 6 can be covered with the flipper for protection, by folding the flipper 7 against the body 2.

Further, in the portable telephone 1, opening the flipper from the body 2 lengthens the distance between the speaker 4 and the microphone 8 and thereby, the microphone can be positioned in front of the mouth of a user while the speaker 4 is positioned in front of an ear of the user, so that the microphone 8 can surely gather voices of the user, thus making it possible to perform communication with a good communication quality.

Further, in the portable telephone 1, three user keys 9 to which the user assigns various functions of the portable telephone 1 to execute the functions are provided under the display 5.

In addition, a 5D (5-direction) jog dial 18 ("jog dial" is a trademark of Sony Corp.) for inputting operations in five directions is disposed on the left side 2C of the body 2.

That is, using the jog dial 10, inputting operations can be made in the two directions: a jog front operation in which the dial 10A is moved in the front direction of the body 2 in parallel (direction shown by arrow JF); and a jog back operation in which the dial 10A is moved in the back direction of the body 2 in parallel (direction shown by arrow JB), in addition to the three directions in which the general jog dial can be moved: a jog rotating operation in which the dial 10A is rotated upward and downward (direction shown by arrow JR); and a jog pressing operation in which the dial 10A is pushed into the body 2 (direction shown by arrow JP). Thereby, the portable telephone 1 can execute various functions and easily assign functions desired by a user to the user keys 9, by using only the 5D jog dial 10.

(2) Circuit Configuration of Portable Telephone

Next the circuit configuration of the portable telephone 1 will be explained.

In actual, in the portable telephone 1, the display 5, the ten keys 6, the user keys 9, the 5D jog dial 10, a RAM (Random Access Memory) 12, the power supply section 13 and a radio transmitter/receiver 14 are connected to the CPU for controlling the whole operations of the portable telephone 1.

The CPU 11 makes the display 5 display various information corresponding to the operation information inputted with an operation inputting section 16 comprising the 5D jog dial 10, the ten keys 6, and the user keys 9. In addition, the CPU 11 controls the radio transmitter/receiver 14 in accordance with the operation information, which is inputted with the operation inputting section 16, to execute various processing corresponding to the operation information such as calling processing and conversation finishing processing.

That is, the radio transmitter/receiver 14, under the control of the CPU 11, performs the calling processing by transmitting a control signal to a base station (not shown) via the antenna 3, and also receives the incoming-call signal from the base station via the antenna 3 and informs the CPU 11 of the call arrival.

Further, during conversation, the radio transmitter/receiver 14 produces an audio signal by amplifying and demodulating the reception signal received via the antenna 3 and outputs it to the speaker, and also produces a transmission signal by modulating and amplifying an audio signal inputted from the microphone 8 and transmits it via the antenna 3.

The CPU 11 executes various additional functions such as an address directory function, a game function, and a schedule management function, corresponding to the operation information inputted with the operation inputting section 16, and makes the display 5 display the various information based on the execution result.

Further, the CPU 11 makes the RAM 12 store various data such as outgoing/incoming call history data from/to the portable telephone 1, telephone number data of the address directory function, and short-cut data registered by the short-cut processing procedure, and execute various functions based on data read out from the RAM 12.

Under the control of the CPU 11, the power supply section 13 supplies a power current outputted from the battery 15 to each section of the portable telephone 1, and charges the battery 15 by supplying a charging current supplied from a charging adapter (not shown) to the battery 15 when the charging adapter is connected to the portable telephone 1.

(3) Changing Menu Screens of Portable Telephone

The portable telephone 1 is so arranged as to easily select and execute various additional functions and various setting functions such as changing an incoming-call sound and ON/OFF setting for a key click sound (these functions are referred to as an item in general term), which are possessed by the portable telephone 1, by using the hierarchically structured menu screens and the 5D jog dial 10.

Figure 2:
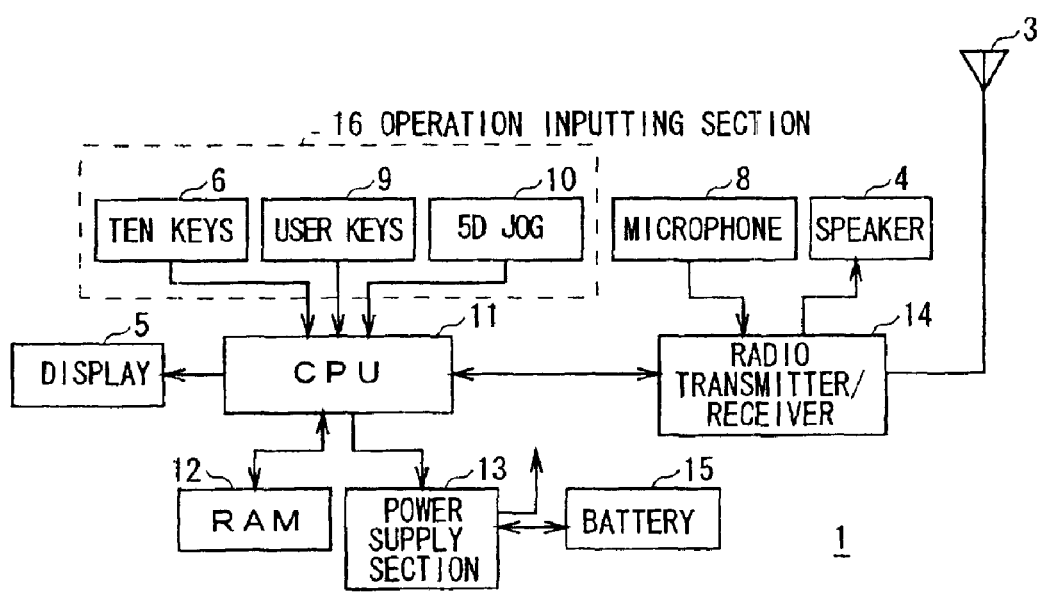
FIG. 2 is a schematic diagram showing the circuit configuration of the portable telephone.
Figure 3:
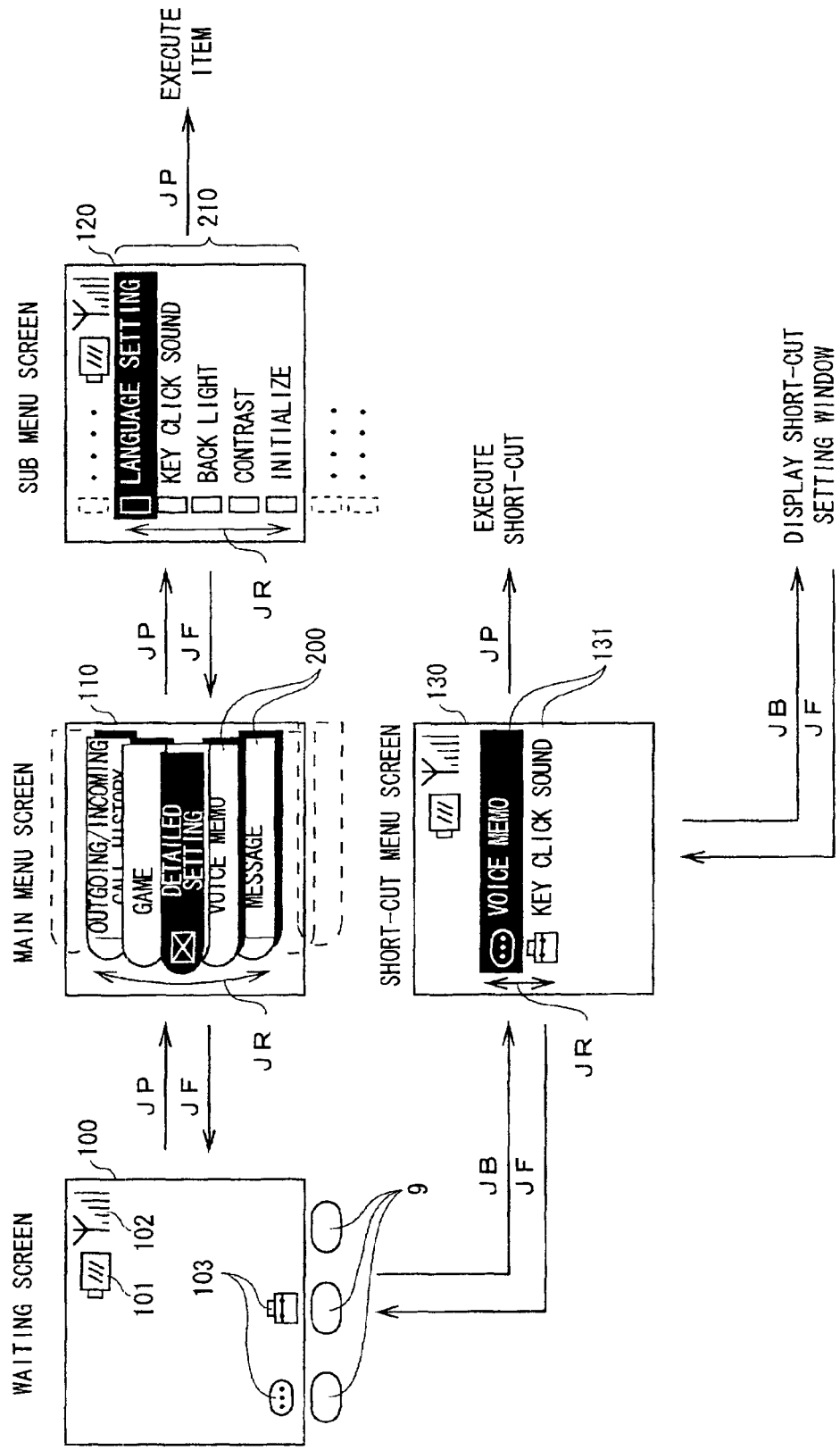
FIG. 3 is a schematic diagram showing the transition of menu screens of the portable telephone.

That is, as shown in FIG. 3, in a waiting state, the portable telephone 1 makes the display 5 display a waiting screen 100 which is the uppermost hierarchy of menu screen. Displayed at the top of this waiting screen 100 are a battery indicator 101 showing the remaining amount of the battery 18 (FIG. 2), and a field strength indicator 102 showing the reception field strength. In addition, displayed at the bottom of the waiting screen 100 are short-cut icons 103 showing the items assigned to the three user keys 9 and registered.

In the portable telephone 1, the 5D jog dial 10 is operated by the jog pressing operation (JP) while the waiting screen 100 is displayed, a main menu screen 110 is displayed on the display 5 accordingly.

Figure 4:
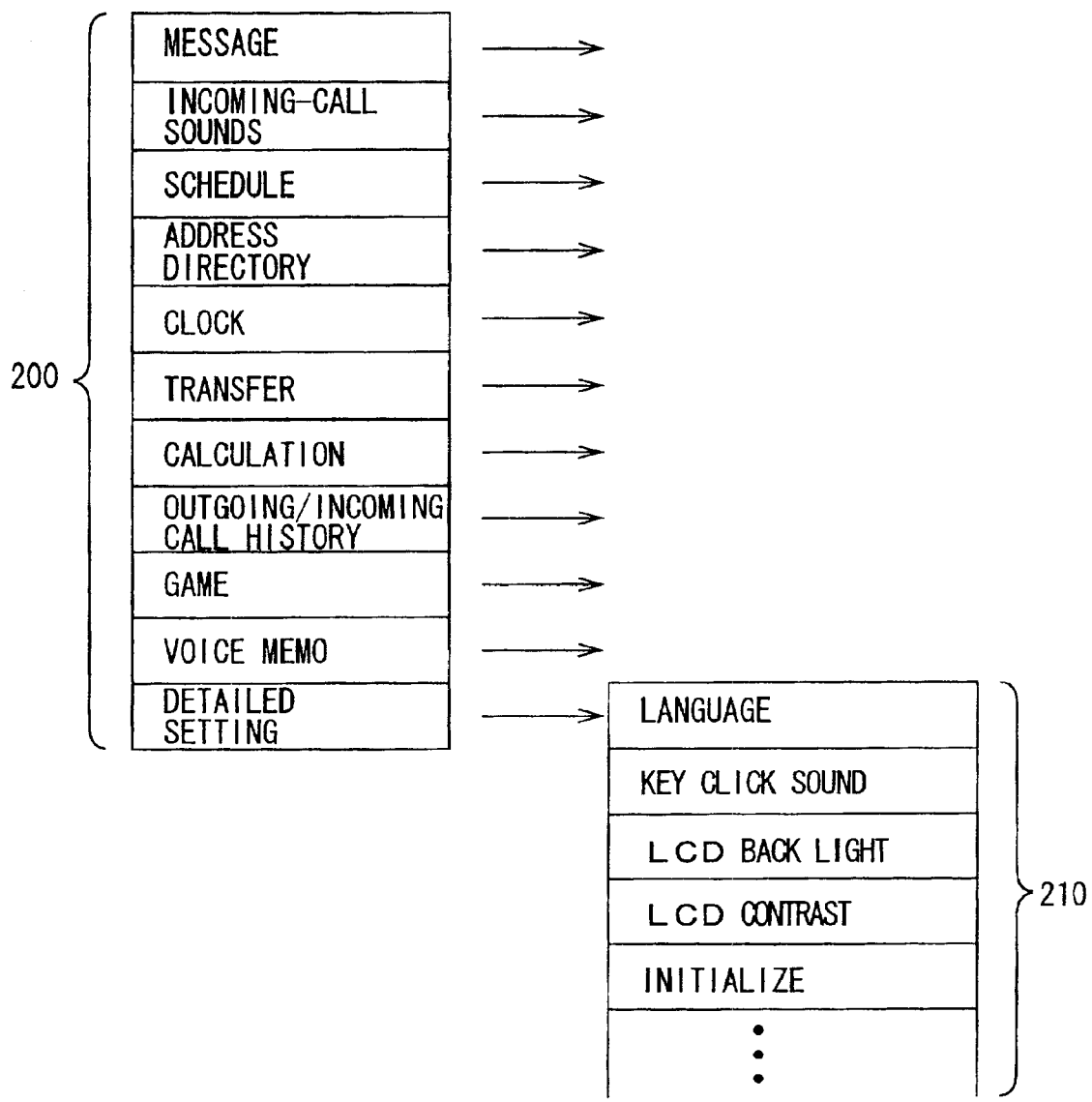
FIG. 4 is a table showing the hierarchical structure of items.

On the main menu screen 110, five out of main menu items 200 shown in FIG. 4 are arranged and displayed in an arc. Out of the five main menu items 200 displayed, one existing the center is displayed reversibly in color to show that the main menu item 200 is under selection.

The main menu items 200 are high-hierarchy items which are roughly collected from all items of the portable telephone 1 in accordance with contents of the items, and each main menu item 200 has plural sub menu items 210 which are correspondingly belonged low-hierarchy items.

In the portable telephone 1, the 5D jog dial 10 is operated by the jog rotating operation (JR) while the main menu screen 110 is displayed, the main menu items 200 are scrolled accordingly and the main menu item 200 under selection can be changed.

In addition, in the portable telephone 1, the 5D jog dial 10 is operated by the jog front operation (JF) while the main menu screen 110 is displayed, the screen is back to the waiting screen 100 again, and on the other hand, the 5D jog dial 10 is operated by the jog pressing operation while the main menu screen 100 is displayed, the sub menu screen 120 is displayed.

This sub menu screen 120 displays five sub menu items 210 belonged to the main menu item selected on the main menu screen 110. Out of the five sub menu items 210 displayed, the uppermost item is displayed reversibly in color to show that the sub menu item 210 is under selection.

In the portable telephone 1, the 5D jog dial 10 is operated by the jog rotating operation while the sub menu screen 120 is displayed, the sub menu items 210 are scrolled accordingly, to change the sub menu item 210 under selection.

In the portable telephone 1, when the 5D jog dial 10 is operated by the jog front operation while the sub menu screen 120, the main menu screen 110 is displayed again, and when the 5D jog dial 10 is operated by the jog pressing operation while the sub menu screen 120 is displayed, the sub menu item 210 under selection is executed.

Thus, in the portable telephone 1, the hierarchically structured menu screens can be changed freely and a desired item can be easily executed, by manipulating only the 5D jog dial 10.

In addition to the above configuration, in the portable telephone 1, when the 5D jog dial 10 is operated by the jog back operation (JB) while the wanting screen 100 is displayed, a short-cut menu screen 130 is displayed on the display 5 accordingly.

The short-cut menu screen 130 shows, at most, three short-cut items 131 which have been registered on a main menu item selection screen 150 or a sub menu item selection screen 160 described later. Out of the short-cut items 131 displayed, the uppermost item is displayed reversibly in color to show that the short-cut item 131 is under selection.

In the portable telephone 1, when the 5D jog dial 10 is operated by the jog rotating operation while the short-cut menu screen 130 is displayed, the short-cut items 131 are scrolled accordingly to change the short-cut item 131 under selection.

Further, in the portable telephone 1, when the 5D jog dial 10 is operated by the jog front operation while the short-cut menu screen 130 is displayed, the waiting screen 100 is displayed again. On the other hand, when the 5D jog dial 10 is operated by the jog pressing operation while the short-cut menu screen 130 is displayed, the short-cut item 131 under selection is executed.

Figure 5:
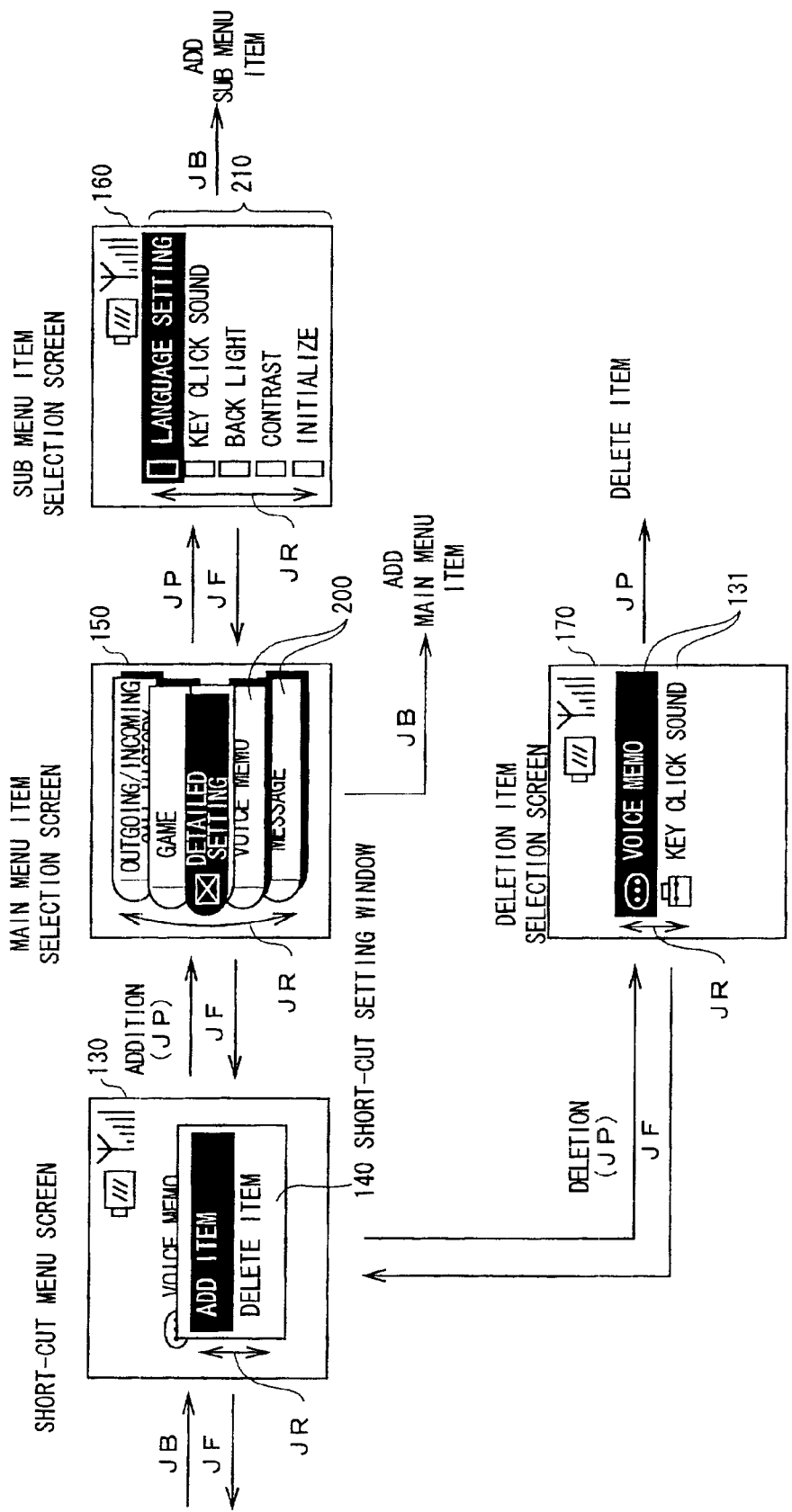
FIG. 5 is a schematic diagram showing the transition of the menu screens of the portable telephone.

Further, in the portable telephone 1, when the 5D jog dial 10 is operated by the jog back operation while the short-cut menu screen 130 is displayed, the short-cut setting window 140 appears on the short-cut menu screen 130 as shown in FIG. 5.

The short-cut setting window 140 displays two message of "add item" and "delete item", and one message is displayed reversibly in color to show that the message is under selection.

In the portable telephone 1, when the 5D jog dial 10 is operated by the jog rotating operation while the short-cut setting window 140 is displayed, reversible display in color of a message is shifted, to change the message under selection.

Further, in the portable telephone 1, when the 5D jog dial 10 is operated by the jog front operation while the short-cut setting window 140 is displayed, the short-cut setting window 140 is deleted.

Furthermore, in the portable telephone 1, when the 5D jog dial 10 is operated by the jog pressing operation while the message "add item" on the short-cut setting window 140 is under selection, the main menu item selection screen 150 is displayed. The main menu item selection screen 150 has the same screen structure as the main menu screen 110 shown in FIG. 3, and the main menu items 200 are scrolled according to the rotation of the 5D jog dial 10 to change the main menu item 200 under selection which is displayed reversibly in color.

Then, in the portable telephone 1, when the 5D jog dial 10 is operated by the jog back operation while the main menu item selection screen 150 is displayed, the main menu item 200 under selection is registered as the short-cut item and the short-cut data stored in the RAM 12 is updated and further, the short-cut icons 103 showing the registered short-cut items are displayed on the waiting screen 100 above the corresponding user keys 9.

In addition, in the portable telephone 1, while the 5D jog dial 10 is operated by the jog front operation while the main menu item selection screen 150 is displayed, the short-cut menu screen 130 and the short-cut setting window 140 are displayed again. On the other hand, when the 5D jog dial 10 is operated by the jog pressing operation while the main menu item selection screen 150 is displayed, the sub menu item selection screen 160 is displayed.

This sub menu item selection screen 160 has the same screen structure as the sub menu screen 120 shown in FIG. 3, and displays five sub menu items 210 belonged to the main menu item 200 selected on the main menu item selection screen 150, and the sub menu items 210 are scrolled according to the jog rotating operation of the 5D jog dial 10 to change the sub menu item 210 under selection which is displayed reversibly in color.

Then, in the portable telephone 1, when the 5D jog dial 10 is operated by the jog front operation while the sub menu item selection screen 160 is displayed, the main menu item selection screen 150 is displayed again.

In addition, in the portable telephone 1, when the 5D jog dial 10 is operated by the jog back operation while the sub menu item selection screen 160 is displayed, the sub menu item 210 under selection is registered as the short-cut item and the short-cut data stored in the RAM 12 is updated and further, the short-cut icons 103 showing the registered short-cut items are displayed on the waiting screen 100 above the corresponding user keys 9.

Further, in the portable telephone 1, when the 5D jog dial 10 is operated by the jog pressing operation while the message "delete item" is under selection on the short-cut setting window 140, the deletion item selection screen 170 is displayed. This deletion item selection screen 170 has the same screen structure as the short-cut menu screen 130 shown in FIG. 3, and the short-cut items 131 are scrolled according to the jog rotating operation of the 5D jog dial 10, to change the short-cut item 131 under selection.

Then, in the portable telephone 1, when the 5D jog dial 10 is operated by the jog front operation while the deletion item selection screen 170, the short-cut menu screen 130 and the short-cut setting window 140 are displayed again. And the 5D jog dial 10 is operated by the jog pressing operation while the deletion item selection screen 170 is displayed, the registered short-cut item 131 under selection is deleted and the short-cut data stored in the RAM 12 is updated and further, the short-cut icon 103 showing the registered short-cut item deleted is deleted and the waiting screen 100 is displayed.

As described above, in the portable telephone 1, a short-cut item can be executed, a desired main menu item or a sub menu item can be registered as the short-cut item, and a registered short-cut item can be deleted, by manipulating only the 5D jog dial 10.

In addition, the portable telephone 1, the short-cut icons 103 showing the registered short-cut items are displayed above the corresponding user keys 9 on the waiting screen 100, which allows a user to recognize the short-cut items which are assigned to the user keys 9.

Then, in the portable telephone 1, when the user presses a user key 9, the CPU 11 functioning as a function executing means reads out short-cut data from the RAM 12 and executes the short-cut item assigned to the user key 9.

(4) Short-cut Processing Procedure

Next, the processing procedures of executing, registering, and deleting the short-cut item, which are described above, will be explained.

Figure 6:
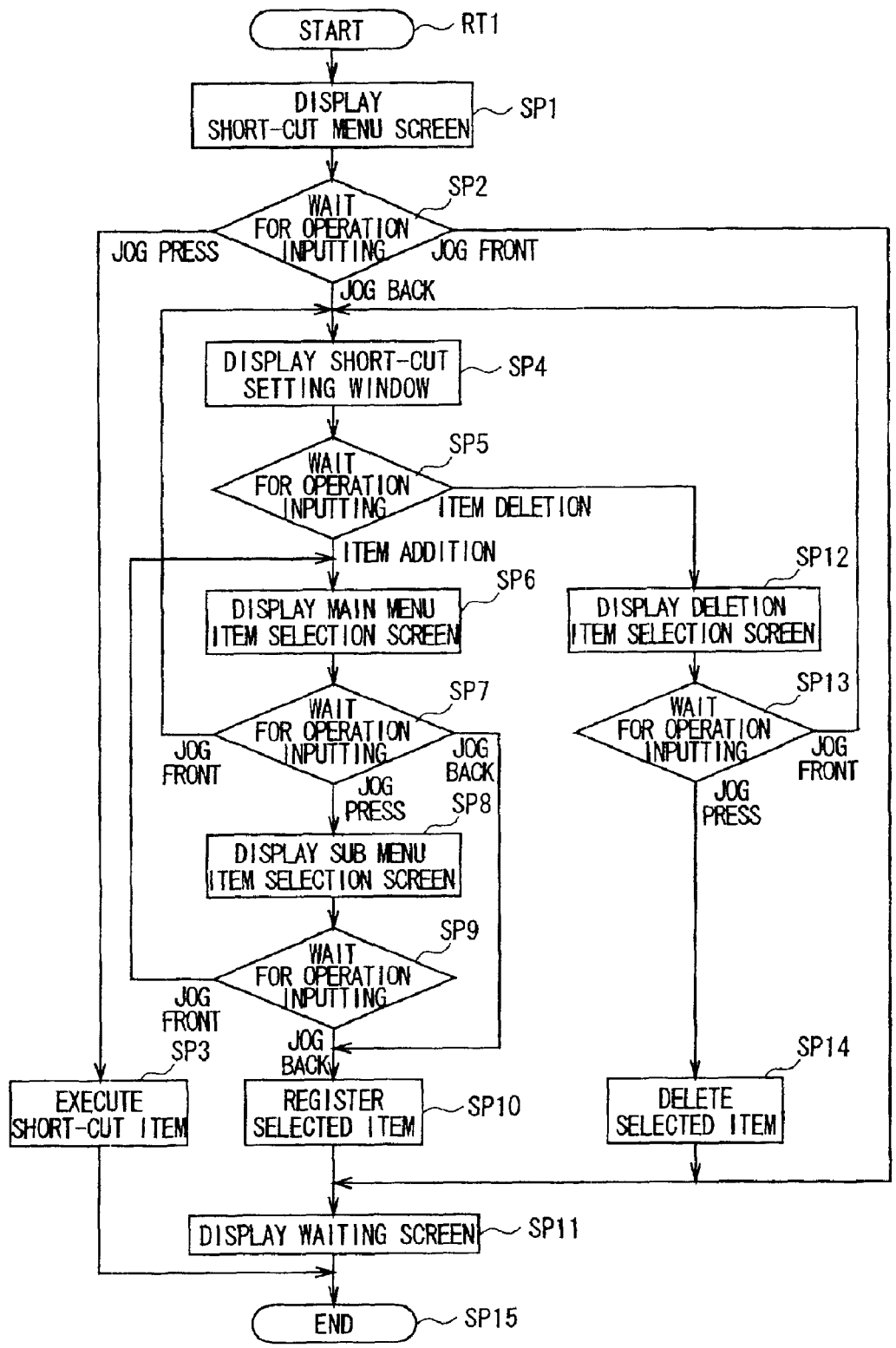
FIG. 6 is a flowchart showing the short-cut processing procedure.

In the short-cut processing procedure as shown in FIG. 6, the CPU 11 of the portable telephone 1 starts the routine RT1 at starting step and moves to step SP1.

At step SP1, when the 5D jog dial 10 is operated by the jog back operation while the waiting screen 100 is displayed on the display 5, the CPU 11 displays the short-cut menu screen 130 on the display 5 accordingly and moves to step SP2.

At step SP2, the CPU 11 waits for the operation of the 5D jog dial 10.

At step SP2, when the jog pressing operation is made, the CPU 11 moves to step SP3, executes the short-cut item selected on the short-cut menu screen 130 and moves to step SP15 in which the processing is terminated.

On the other hand, the jog front operation is made at step SP2, the CPU 11 moves to step SP11, displays the waiting screen 100 on the display 5 and moves to step SP15 in which the processing is terminated.

In addition, the jog back operation is made at step SP2, the CPU 11 functioning as the function assigning means moves to step SP4, displays the short-cut setting window 140 on the display 5 and move to the next step SP5.

At step SP5, the CPU 11 waits for the operation of the 5D jog dial 10.

At step SP5, the operation to instruct "add item" is inputted, the CPU 11 moves to step SP6, displays the main menu item selection screen 150 on the display 5 and moves to next step SP7.

At step SP7, the CPU 11 waits for the operation of the 5D jog dial 10.

At step SP7, the jog front operation is made, the CPU 11 returns to step SP4 and displays the short-cut setting window 140 on the display 5 again.

On the other hand, the jog back operation is inputted at step SP7, the CPU 11 moves to step SP10, registers the main menu item selected on the main menu item selection screen 150 as the short-cut item and moves to step SP11.

At step SP11, the CPU 11 displays the waiting screen 100 on the display 5. At this time, the CPU 11 additionally displays the short-cut icon 103 showing the newly registered short-cut item on the waiting screen 100. Then, the CPU 11 moves to step SP15 and terminates the processing.

On the other hand, the jog pressing operation is made at step SP7, the CPU 11 moves to step SP8, displays the sub menu item selection screen 160 on the display 5 and moves to next step SP9.

At step SP9, the CPU 11 waits for the operation of the 5D jog dial 10.

The jog front operation is made at step SP9, the CPU 11 returns to step SP6 and displays the main menu item selection screen 150 on the display 5 again.

On the other hand, the jog back operation is made at step SP9, the CPU 11 moves to step SP10, registers the sub menu item selected on the sub menu item selection screen 160 and moves to step SP11.

At step SP11, the CPU 11 displays the waiting screen 100 on the display 5. At this time, the CPU 11 additionally displays the short-cut icon 103 showing the newly registered short-cut item on the waiting screen 100. Then, the CPU 11 moves to step SP15 and terminates the processing.

On the other hand, the operation instructing "delete item" is inputted at step SP5, the CPU 11 moves to step SP12, displays the deletion item selection screen 170 on the display 5 and moves to next step SP13.

At step 13, the CPU 11 waits for the operation of the 5D jog dial 10.

The jog front operation is made at step SP13, the CPU 11 returns to step SP4 and displays the short-cut setting window 140 on the display 5 again.

On the other hand, the jog pressing operation is made at step SP13, the CPU 11 moves to step SP14, deletes the registered short-cut item selected on the deletion item selection screen 170 and moves to step SP11.

At step SP11, the CPU 11 displays the waiting screen 100 on the display 5. At this time, the CPU 11 deletes the short-cut icon 103 showing the registered short-cut item deleted from the waiting screen 100. Then, the CPU moves to step SP15 and terminates the processing.

(5) Operations and Effects of Embodiment

In the aforementioned configuration, in the portable telephone 1, when the 5D jog dial 10 is operated by the jog back operation while the waiting screen 100 is displayed on the display 5, the short-cut menu screen 130 is displayed on the display 5 accordingly.

In the portable telephone 1, when the 5D jog dial 10 is operated by the jog back operation while the short-cut menu screen 130 is displayed on the display 5, the short-cut setting window 140 is displayed accordingly. Then, in the portable telephone 1, when "add item" is selected on the short-cut setting window 140, the main menu item selection screen 150 is displayed accordingly. And when the 5D jog dial 10 is operated by the jog pressing operation while the main menu item selection screen 150 is displayed, the sub menu item selection screen 160 is displayed accordingly.

Then, when the 5D jog dial 10 is operated by the jog back operation while the main menu item selection screen 150 or the sub menu item selection screen 160 is displayed, the main menu item 200 or the sub menu item 210 selected on the selection screen is registered as the short-cut item. Then, in the portable telephone 1, the short-cut icons 103 showing the registered short-cut items are displayed on the waiting screen 100 above the corresponding user keys 9.

As described above, in the portable telephone 1, both the main menu items 200 which are higher hierarchical items obtained by roughly gathering the items of the portable telephone 1 and the sub menu items 210 which are lower hierarchical items belonged to the corresponding main menu items can be equally registered as the short-cut items.

Further, in the portable telephone 1, the short-cut icons 103 showing the registered short-cut items are displayed on the waiting screen 100 above the corresponding user keys 9, which allows a user to correctly recognize the short-cut items assigned to the user keys 9.

Then, when a user key 9 is pressed by a user, the portable telephone 1 executes the short-cut item assigned to the user key 9.

Thus, in the portable telephone 1, if items that the user often uses are registered as the short-cut items, the items can be easily executed by pressing the user key 9 only once, regardless of whether the item is the main menu item 200 or the sub menu item 210.

Further, in the portable telephone 1, since the short-cut items are directly executed in response to the pressing of the user keys 9, the operation time to execute items can be shortened as compared with the case where the hierarchically structured menu screens are changed and a desired item is selected and executed. Thereby, the communicable time of the portable telephone 1 can lengthen by effectively using the limited capacity of the battery.

According to the above configuration, in the portable telephone 1, the main menu items 200 or the sub menu items 210 desired by the user are registered as the short-cut items and the short-cut icons 103 showing the short-cut items are displayed on the waiting screen 100 corresponding to the user keys 9. Thereby, the short-cut items can be easily executed by pressing only the user keys 9.

Further, since the portable telephone 1 is provided with the 5D jog dial 10 which can be manipulated in the five directions, the short-cut items can be easily executed, registered, and deleted by manipulating only the 5D jog dial 10.

(6) Other Embodiments

Note that, the aforementioned embodiment has described the case of executing, registering and deleting the short-cut items by using the 5D jog dial 10. The present invention, however, is not limited to this and may be applied to various operation inputting means such as a stick type pointing device. Further, the aforementioned embodiment has described the case of executing, registering and deleting the short-cut items in the portable telephone 1. This invention, however, is not limited to this and may be applied to the executing, registering and deleting processing of short-cut items in various information processing apparatuses such as a personal computer, a PDA (Personal Digital Assistant).

According to the present invention as described above, functions desired from the hierarchically structured menus by a user are assigned to execution keys, a function assigned to an execution key is executed in response to the pressing of the execution key, so that the functions can be executed with simple operations, regardless of the hierarchies of the menus to which the functions are belonged.

Further, the execution keys are provided near the display for displaying various information, and symbols showing the functions assigned to the execution keys are displayed near the corresponding execution keys, which allows a user to correctly recognize the functions assigned to the execution keys.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A portable telephone for executing a plurality of functions selected from hierarchically structured menus, the telephone comprising:

a plurality of execution keys for instructing execution of respective functions from the plurality of functions, wherein the number of the plurality of functions is greater than the number of the plurality of execution keys;

function assigning means for assigning selected ones of the plurality of functions desired to selected ones of the plurality of execution keys;

display means for displaying information;

a five-direction jog dial for movement in any of five directions, so as to perform input operations relative to the information displayed on the display means; and control means for causing the function assigned to the execution key to be executed in response to a pressing of one of the plurality of execution keys or a movement of the five-direction jog dial, wherein the plurality of execution keys is provided near the display means; and the display means is controlled by the control means to display a waiting screen showing a plurality of short-cut icons equal in number to the selected ones of the plurality of execution keys and representing the respective functions assigned to the selected ones of the plurality of execution keys by the control means, wherein each short-cut icon is shown on the waiting screen adjacent a corresponding one of the plurality of execution keys.

2. The portable telephone according to claim 1, wherein the function assigning means assigns the function desired to the execution key regardless of a hierarchy of a menu containing the function.

* * * * *